United States Patent

Toshima et al.

(10) Patent No.: US 8,771,565 B2
(45) Date of Patent: Jul. 8, 2014

(54) METHOD FOR MANUFACTURING A DISC BRAKE PAD

(75) Inventors: Shinichi Toshima, Gunma (JP); Sakae Yoshihara, Gunma (JP)

(73) Assignee: Nisshinbo Brake Inc., Tokyo (JP)

(*) Notice: Subject to any disclaimer, the term of this patent is extended or adjusted under 35 U.S.C. 154(b) by 132 days.

(21) Appl. No.: 12/969,544

(22) Filed: Dec. 15, 2010

(65) Prior Publication Data

US 2011/0147991 A1  Jun. 23, 2011

(30) Foreign Application Priority Data

Dec. 18, 2009  (JP) ................................. 2009-287608

(51) Int. Cl.
*B29C 47/00* (2006.01)

(52) U.S. Cl.
USPC .......................................................... 264/119

(58) Field of Classification Search
USPC .......................................................... 264/119
See application file for complete search history.

(56) References Cited

U.S. PATENT DOCUMENTS

2007/0024020 A1*  2/2007  Orford ........................ 280/242.1

FOREIGN PATENT DOCUMENTS

JP  2006-83978 A  3/2006

* cited by examiner

*Primary Examiner* — Joseph S Del Sole
*Assistant Examiner* — John Robitaille
(74) *Attorney, Agent, or Firm* — Tracy M. Heims; Apex Juris, pllc (57) ABSTRACT

To provide a manufacturing method for a disc brake pad using a forming die to form a final inclined surface on a friction material, where the resulted friction material is entirely uniform even if the flowability of the powdered raw friction material is insufficient. The method for manufacturing a disc brake pad includes the steps of preliminarily forming a preliminarily formed product by pressurizing without heating the powdered raw materials in a metal preliminarily forming die, and forming the final inclined surface on the friction material using a metal forming die with an inclined surface, the step of preliminarily forming including forming a temporary inclined surface, having a larger angle than the final inclined surface of the friction material, on the preliminarily formed product at an opposite side thereof to be fixed to a back plate, and forming a recess portion on the preliminarily formed product at a side thereof to be fixed to the back plate.

1 Claim, 6 Drawing Sheets

METHOD FOR MANUFACTURING A DISC BRAKE PAD

CROSS-REFERENCE TO RELATED APPLICATION(S) AND CLAIM OF PRIORITY

The present application claims the benefit under 35 U.S.C. section 119(a) of Japanese Patent Application filed in the Japan Patent Office on Dec. 18, 2009, and assigned serial number 2009-287608, the disclosure of which is incorporated herein by reference.

FIELD OF INVENTION

This invention relates to a method for manufacturing a disc brake pad used for motor vehicles, particularly a method for manufacturing a disc brake pad which is capable of eliminating/minimizing brake noises.

BACKGROUND OF INVENTION

A disc brake pad for a disc brake of a motor vehicle generally is a combination of a steel back plate and a friction material fixed on the steel back plate. The friction material may be formed by pressurizing and heating a mixture of powdered materials including such as a fibrous material, a filler, and a binder. A disc brake brakes a motor vehicle with a frictional force generated as pressing the disc brake pad against a metal disc rotor.

However, conventional disc brakes have problems of making brake noises because of disc brake pad and/or disc rotor vibration during the brake operation. Such brake noises have been developed to minimize the disturbing brake noises. One conventional method to prevent the brake noises is to form inclined surfaces at both ends of the disc brake pad.

Figure 5A:
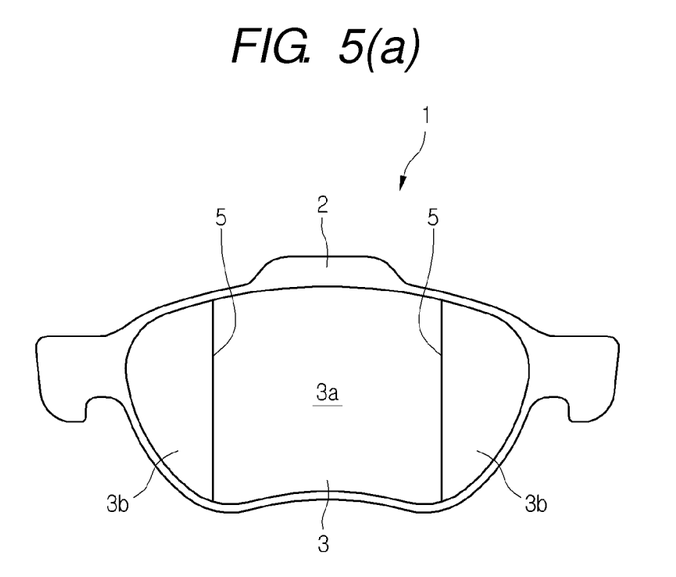
FIG. 5(a) is a plan view thereof and FIG. 5(b) is a front view thereof.
Figure 5B:
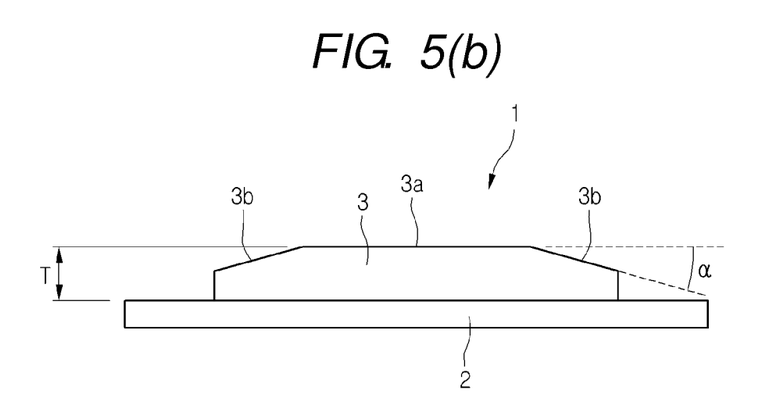

FIGS. 5 and 6 represents resultant disc brake pads in general. Appearances of the resultant disc brake pads are the same for both the present invention and the conventional arts; however, the differences between the present invention and the conventional arts reside in the process of manufacturing the disc brake pad, contents, and the effect of the resultant products. FIG. 5 illustrates the resultant disc brake pad in general with the inclined surfaces, where FIG. 5(a) is a plan view thereof and FIG. 5(b) is a front view thereof. A disc brake pad 1 as shown in FIG. 5 is a combination of a steel back plate 2 and a friction material 3 fixed on the back plate 2. The friction material 3 has a plane friction surface 3a on an intermediate portion thereof and inclined surfaces 3b, 3b at both side portions thereof. Borderlines 5, 5 between the friction surface 3a and the inclined surfaces 3b, 3b are parallel. Accordingly, the length of the friction surface 3a contacting an outer circumferential side of the disc rotor is designed to be substantially equal to the length of the frictional surface 3a contacting an inner circumferential side of the disc rotor.

Forming such inclined surface 3b on the disc brake pad 1 prevents the disc brake pad 1 from scratching the disc rotor, thereby eliminating/minimizing the brake noises.

Figure 6A:
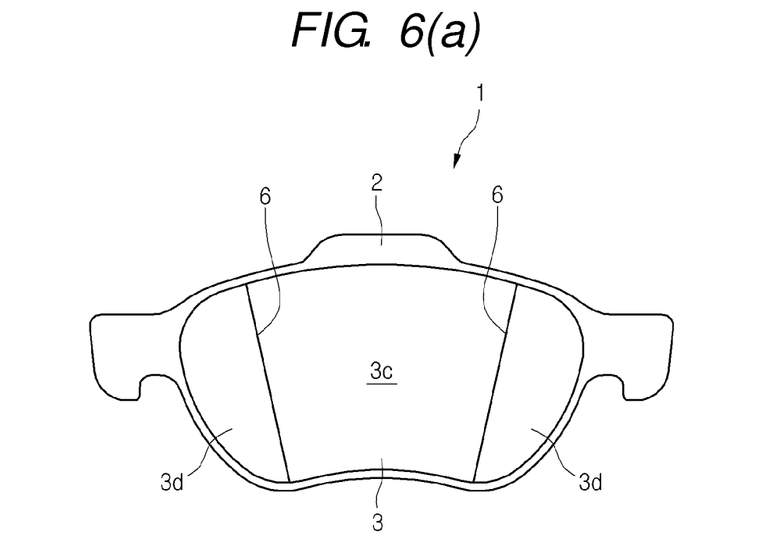
FIG. 6(a) illustrates an example of the disc brake pad with the fun shape friction surface expanding toward the outside of the disc rotor and FIG. 6(b) illustrates an example of the reverse fan shape friction surface.

FIG. 6 illustrates another resultant disc brake pad in general with inclined surfaces. The inclined surfaces 3d, 3d of FIG. 6(a) are formed so that an upper portion of the friction surface 3c expands toward outside of the disc rotor to form a fan shape.

Vibration of the disc brake pad 1 and/or the disc rotor during the brake operation are considered to be causes of the brake noises, and the borderlines on the disc brake pad becomes a right angle against the tangent line of the disc rotor, thereby providing more effective vibration control on the disc rotor. Accordingly, the conventional friction surfaces are formed in the fan shape as shown in FIG. 6(a).

Figure 7:
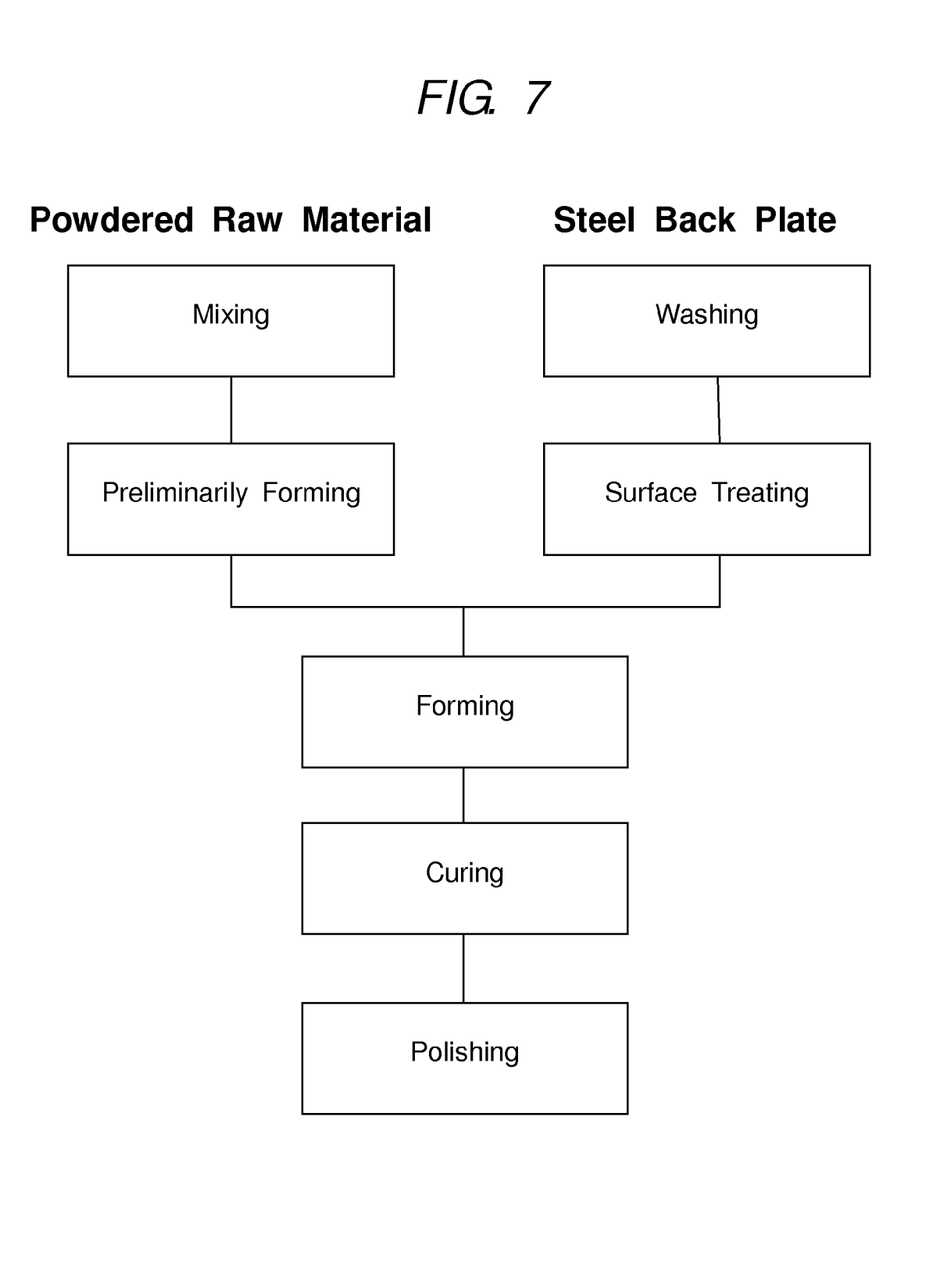
FIG. 7 is a flow chart explaining a general process of manufacturing the disc brake pad using the metal forming die.

FIG. 7 is a flow chart explaining a general process of manufacturing a disc brake pad using a metal forming die. In FIG. 7, mixing and step for the powdered raw material and a preliminarily forming step for the mixed powdered raw material take place while washing and surface-treated steps for the steel back plate take place. Further in this process, the preliminarily formed product is fixed on the steel back plate to go through forming, curing, and polishing steps. If the above-explained inclined surfaces 3b, 3b, 3d, 3d, 3f, 3f, are formed by grinding the friction material surface, such grinding step should take place after a polishing step in FIG. 7 is typically needed. Alternatively, the grinding step can be eliminated to simplify the entire process and to minimize grinding dusts by utilizing the metal forming die, where the step of forming the inclined surfaces takes place in a preliminary forming and forming steps in FIG. 7.

Patent Document 1 illustrates a conventional manufacturing process for a preliminarily formed product with a temporary inclined surface by pressurizing and molding the powdered raw materials without heating in a metal preliminarily forming die and a manufacturing process of the friction material with a final inclined surface in a desirable angle by heating and pressurizing the preliminarily formed product in a metal forming die with an opening same shape as the opening of the metal preliminarily forming die, so as to provide a larger inclined surface angle of the preliminarily formed product than the inclined surface angle of the friction material.

In the Patent Documents 1, the temporary inclined surface formed on the preliminarily formed product has a steeper than the final inclined surface to be formed on the friction material. The inclined surface of the metal forming die is designed to contact only inside of the temporary inclined surface of the preliminarily formed product leaving a wage shape space at the outside of the contacting portion, and therefore the powdered raw materials is melted by heating; however, because of the space reserved between the metal die and the preliminarily formed product, the raw material flows to provided a entirely uniform friction material.

Yet, when the amount of the fibrous materials in the friction material is large and the flowability of the powdered raw materials is not sufficient, the manufacturing method of the Patent Document 1 cannot often provide the entirely uniform friction material.

More specifically, there is not enough space for the powdered raw materials to flow and not enough flowability of the powdered raw materials, thereby providing a disc brake pad having a friction material with a higher density at the final inclined surface portion thereof. As such that the high density of the friction material at the final inclined surface portion, when the final inclined surface portion disappears due to the friction material wear, brake noises tend to occur upon the disc rotor frictionally engaging the high density friction material without the final inclined surface.

[Patent Document 1] Japanese Provisional Patent Publication No. 2006-83978

SUMMARY OF THE INVENTION

The present invention resolves the above-identified problems and one of the main objects of this invention is to provide a manufacturing method to form an inclined surface on the disc brake pad utilizing a forming die whereby a friction material of the disc brake pad is entirely uniform, even if the amount of fibrous materials in a friction material is large and therefore the powdered raw friction materials lack sufficient flowability.

To achieve the object stated above, the present invention offers the method for manufacturing a disc brake pad for a disc brake of a motor vehicle, including steps of preliminarily forming an intermediary formed product having a temporary inclined surface on an opposite side to be fixed to a back plate by pressurizing and molding powder materials with a metal preliminarily forming die with a first inclined surface; and forming a final inclined surface, having a smaller angle than the temporary inclined surface, on a friction material by pressurizing and molding the intermediary formed product on the back plate with a metal forming die with a second inclined surface. In the preliminarily forming step, a recess portion is formed on the intermediary formed product at a side to be fixed to the back plate during the step of preliminarily forming, and the recess portion disappears during the step of forming the final inclined surface.

According to the invention, the recess portion is formed on the preliminarily formed product at a side to be fixed on the back plate to secure a sufficient space for flowing the powdered raw materials, and therefore the powdered raw materials can sufficiently flow even if the amount of fibrous material in the friction materials is large, thereby providing an entirely uniform friction material. When the melting process is in progress, the second inclined surface of the metal forming die contacts the melted friction material, leaving no space therein, and the resultant friction material ultimately has the final inclined surface that has a same inclination of the second inclined surface of the metal forming die.

According to the manufacturing method of the disc brake pad of this invention, in the manufacturing process of the disc brake pad with the final inclined surface on the friction material using the forming die, the amount of fibrous materials in the friction material is large, thereby providing an entirely uniform friction material, even if the flowability of the powdered raw materials is insufficient.

Because of the manufacturing method according to this invention, the density of the friction material at the final inclined surface portion is equal to the density of the friction surface portion, and this density equality prevents the brake noises, even if the final inclined surface disappears due to the friction material wear.

BRIEF DESCRIPTION OF THE DRAWINGS

The above and other objects of the present invention will become readily apparent by reference to the following detailed description when considered in conjunction with the accompanying drawings wherein:

FIG. 3 is a view of the metal forming die used in the manufacturing method of this invention, where

FIG. 5 illustrates the resultant disc brake pad in general with the final inclined surfaces, where

FIG. 6 illustrates another resultant disc brake pad in general, where

DETAILED DESCRIPTION OF THE PREFERRED EMBODIMENT

Figure 1:
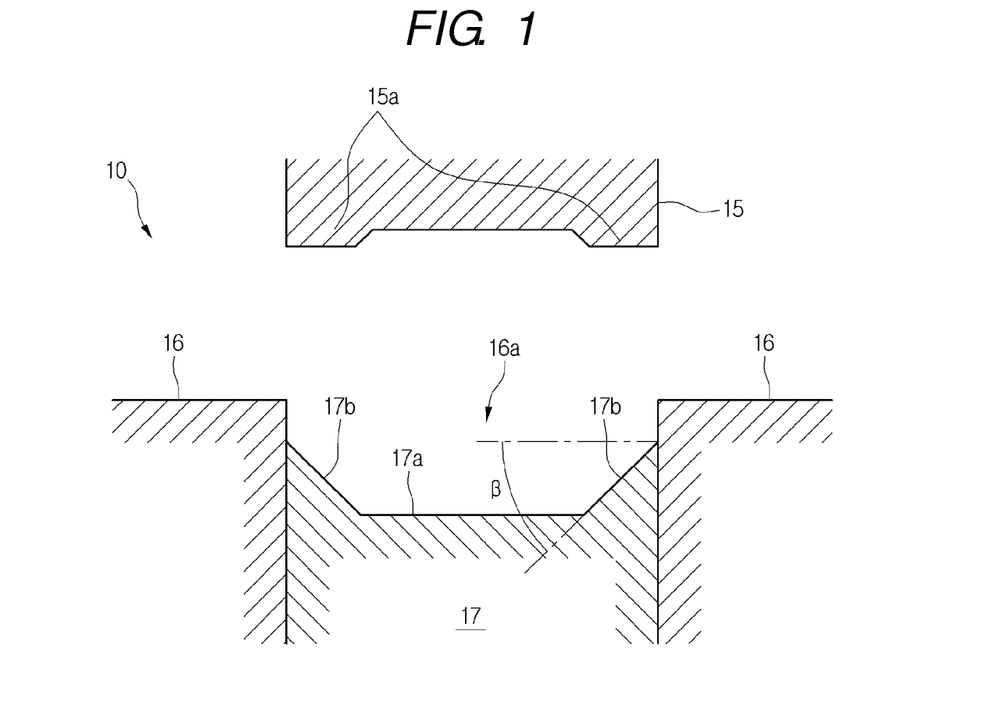
FIG. 1 is a view illustrating the metal preliminarily forming die used in the manufacturing method of this invention.
Figure 6B:
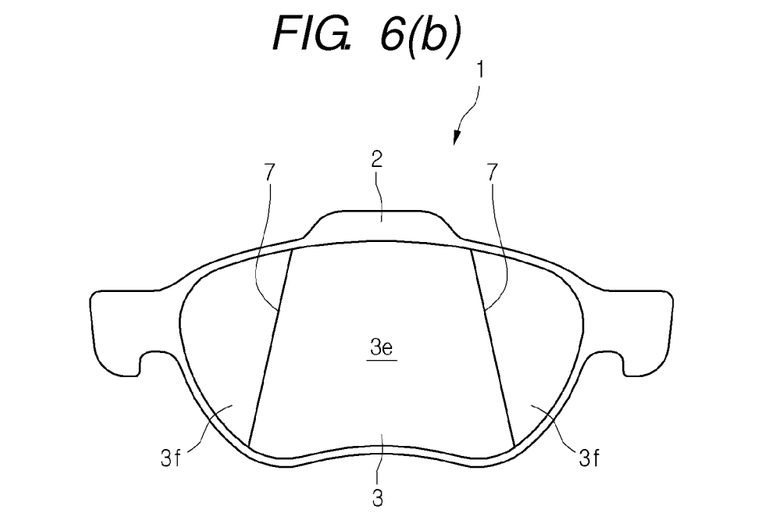

Preferred embodiments of this invention will be explained with reference to the drawings. FIG. 1 is a view illustrating the metal preliminarily forming die used in the manufacturing process of this invention. The metal preliminarily forming die 10 is a combination of three metal die parts including an upper die 15, a frame die 16, and a plunger 17. These three parts are set in a press machine while the frame die 16 is fixed but the upper die 15 and the plunger 17 are vertically movable. A cross-section shape of a hollow portion 16a of the frame die 16 has the same shape as a shape of the friction material 3 as appeared in FIG. 5(a) viewing for a plane, and the hollow portion 16a vertically penetrates through the frame die 16. The plunger 17 is vertically movable within the hollow portion 16a. Also, a plan surface 17a is formed at an intermediate portion of an upper surface of the plunger 17, and first inclined surfaces 17b, 17b are formed at both ends thereof. An angle of the first inclined surface 17b is β. The first inclined surface 17b is formed on the plunger 17, and therefore, borderlines between the first inclined surface and plain surface are not limited to parallel borderlines 5, 5 as shown in FIG. 5 but can be unparallel borderlines 6, 6 and 7, 7 as shown in FIGS. 6(a) and 6(b). Furthermore, the upper die 15 has excess thickness portions 15a, 15a to form recess portions 30c, 30c in a later described preliminarily formed product 30.

The upper die 15 is elevated in FIG. 1 to inject the powdered raw friction materials in the hollow portion 16a of the frame die 16 over the plunger 17, and the upper die 15 is gone down and the plunger 17 is lifted up in order to pressurize the powdered raw friction materials.

Figure 2:
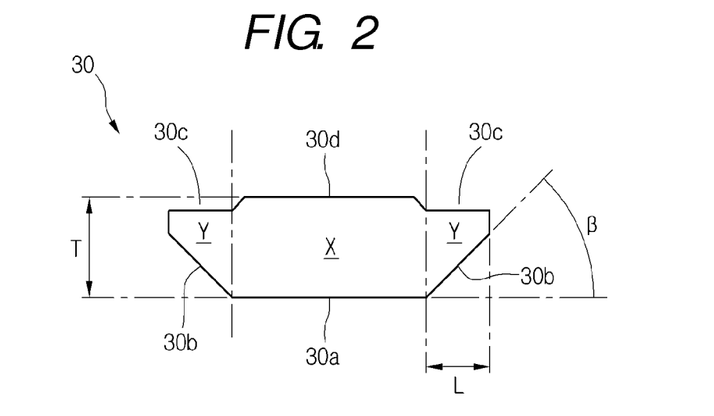
FIG. 2 is a front view of the preliminarily formed product.

FIG. 2 is a front view of the preliminarily formed product 30 and illustrates the configuration of the preliminarily formed product 30 after pressurized molding within the metal preliminarily forming die 10. The shape of the preliminarily formed product 30 viewing for a plane is the same as that of the final product of FIG. 5(a), but the density thereof is very low and the thickness T thereof is about two times more than that of the final product which is compressed in a predetermined density as pressurized to fix on the back plate 2. The preliminarily formed product 30 has a flat surface 30a, functioning as a friction surface at an intermediate portion of the lower surface of the figure, which has the temporary inclined surfaces 30b, 30b at both ends thereof, and has an opposite surface to be fixed on the back plate 2, which has recess portion 30c, 30c at both ends thereof. The angle of the temporary inclined surface 30b is β, which is same as the angle of the first inclined surface 17b formed on the plunger 17 of the metal preliminarily forming die 10. The preliminarily formed product 30, comparing the density of an X portion including the flat surface 30a to a density of a Y portion including the temporary inclined surface 30b, is such that the Y portion of the temporary inclined surface 30b is larger.

Figure 3A:
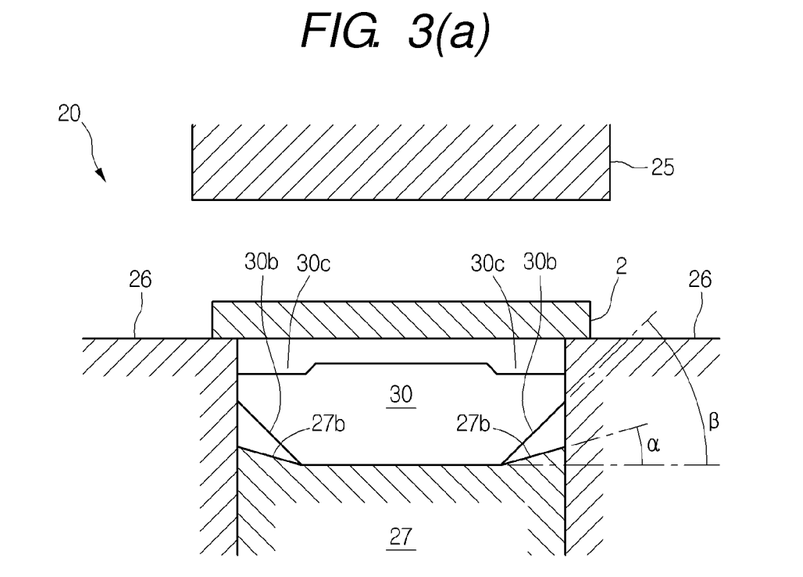
FIG. 3(a) illustrates an initial stage of the forming process and FIG. 3(b) illustrates the completed forming process.
Figure 3B:
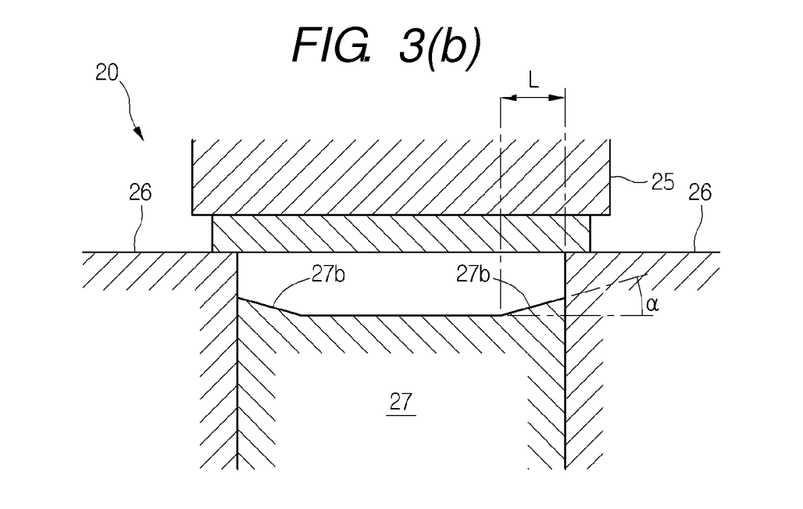

The preliminarily formed product 30 produced through the above-process will be fixed to the back plate 2 according to the following description. First, the preliminarily formed product 30 is placed in a metal forming die 20 as shown in FIG. 3(a). The metal forming die 20 basically has almost the same structure as the metal preliminarily forming die 10. That is, the metal forming die includes an upper die 25, a frame die 26, and a plunger 27 vertically moving in a space penetrating through the frame die 26. The frame die 26 has an opening showing the same shape and size as the frame die 16 of a metal preliminarily forming die 16. Both sides of an upper surface of the plunger 27 have second inclined surfaces 27b, 27b. As shown in FIG. 2, the length of the second inclined surface 27b is same as the length of the temporary inclined surface 30b of the preliminarily formed product 30, which is a length L, and the angle thereof is an α.

The plunger 27 is stopped in an appropriate position within the frame die 26, and the preliminarily formed product 30 is placed in the space within the frame die 26. Next, the back plate 2 is mounted on the upper surface of the frame die 26. The back plate 2 is set at a predetermined position by a positioning member formed in the frame die 26, which is not shown in the figures.

Then, the upper die 25 is gone down until it makes contact with an upper side of back plate 2 while the plunger 27 is lifted until the preliminarily formed product 30 is pressurized and heated to be fixed on the back plate 2.

Figure 4:
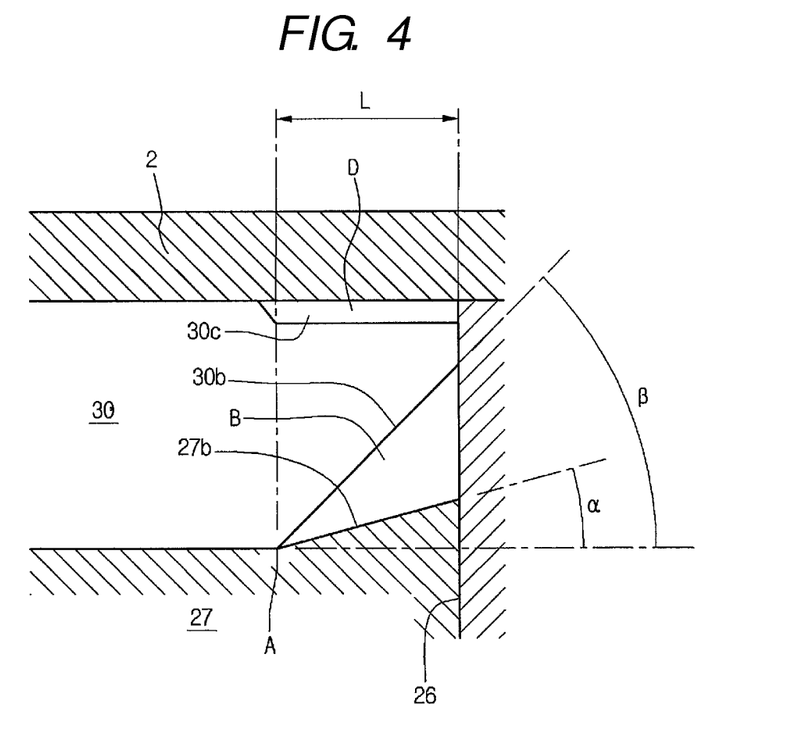
FIG. 4 is an enlarged view of the portion showing a back plate, a plunger, and one of the temporary inclined surfaces of the preliminarily formed product.

FIG. 4 is an enlarged view of one end of the back plate 2, the plunger 27, and the preliminarily formed product 30, particularly showing a consignation that the plunger approaches the back plate until a height of the preliminarily formed product. As illustrated in FIG. 4, the lateral length of second inclined surfaces 27b and lateral length of temporary inclined surface 30b are the same, and the angle of the temporary inclined surface 30b of the preliminarily formed product 30 is β, while the angle of the second inclined surface 27b formed on the upper surface of the plunger 27 is α, thereby establishing β>α. Accordingly, these temporary inclined surface 30b and second inclined surfaces 27b are contacting at an end or borderline A inside thereof but are apart from each other at an end outside thereof, thereby forming a wedge shaped space B between the temporary inclined surface 30b and the second inclined surface 27b. Also, the recess portion 30c is formed at the upper side of the preliminarily formed product 30 to be fixed on the back plate 2, and a space D is formed between the preliminarily formed product 30 and the back plate 2.

The upper die 25 is pressed against the back plate 2 and the back plate 2 is pressed against the frame die 26 to lift the plunger 27 in the frame die 26, and the preliminarily formed product 30 is pressed against the back plate 2. Simultaneously, heat is transmitted to the preliminarily formed product 30 through the surrounding metal forming die, thus melting the preliminarily formed product 30. While melting, the raw friction material flows into the space B and the space D and therefore, after melting, the friction material 3 is produced out, and the density of the final inclined surface portion and the friction surface portion becomes approximately the same.

FIG. 5 is a view of the disc brake pad 1 removed from the metal forming die 20 after going through the forming process and FIG. 5(a) is a plan view and FIG. 5(b) is a front view. This disc brake pad 1 is same as the above-described disc brake pad in general. The angle α of the final inclined surface 3b is same as the angle of the second inclined surface 27b formed on the plunger 27 of the metal forming die 20. Thereafter, a polishing process may be performed as necessary and appropriate to produce the final product.

The raw friction material, which has low flowability of the powdered raw material due to including a relatively large amount of the fibrous material and is shown in Table 1 below, is mixed for about 10 minutes with a "Roedige" mixer, and the resulted raw friction material mixture is placed in the preliminarily forming die to pressurize for about 1 minute to produce a preliminarily formed product. The preliminarily formed product and a prewashed and pre-surface treated back plate are superposed and placed in the metal forming die to heart-press form the same under the forming pressure of 40 MPa for about 5 minutes, which is then cured in a heat furnace under 200° C. for about 4 hours, and thereafter the cured disc brake pad is coated, baked, and polished to produce the disc brake pad of the embodiment and comparative example.

TABLE 1

| MATERIAL | CONTENT (VOLUME %) |
|---|---|
| Stainless Fiber | 5 |
| Copper Fiber | 8 |
| Aramid Fiber | 10 |
| Phenoic Resin | 15 |
| Stannic Sulfide | 3 |
| Coke | 10 |
| Flat Potassium Titanate | 15 |
| Barium Sulfate | 15 |
| Cashew Dust | 10 |
| Diamond Pulverized Powder | 9 |
| TOTAL | 100 |

TABLE 2

| | | Embodiment | Comparative Example |
|---|---|---|---|
| Preliminary Formed Product | Existence of Inclined surfaces on both ends at the friction surface side | Yes | Yes |
| | Existence of recess at the surface to be fixed on the back plate | Yes | No |
| Specific Gravity | Friction surface | 2.79 | 2.69 |
| | Inclined surface | 2.77 | 2.88 |
| Porosity | Friction surface | 13.1 | 13.8 |
| | Inclined surface | 13.3 | 11.4 |
| Noise Reduction Efficiency | New/unused condition | ◎ | ◎ |
| | After wearing the inclined surface | ◎ | X |

The evaluation is conducted by the brake noises test using the actual vehicle and measurement of the specific gravity and porosity. The porosity represents the rate of void existing in the friction material relative to an apparent total volume of the friction material by volume %. The specific gravity measurement is conducted following the Japanese Industrial Standard (JIS) D4417, and the porosity measurement is conducted following the JIS D4418. A test piece for the measurement of the specific gravity and porosity is taken out from the friction surface 3a and the final inclined surface 3b. Here, the friction surface and the final inclined surfaces are divided according to X and Y of FIG. 2.

The embodiment shows no major difference in the specific gravity between the friction surface and the final inclined surface but the comparative example showed the difference between the same. This difference in the comparative example is due to the insufficient raw material flow.

Symbols in the above Table 2 represent the degree of brake noises, where ◎ is a symbol when generating no brake noises, ○ is a symbol when almost generating no noises, Δ is a symbol when slightly generating the brake noises, and X is a symbol when clearly generating the brake noises. The embodiment and the comparative example, when both are new, generated no noises.

However, when the brake pad is used until the final inclined surfaces disappear, the embodiment was ◎ and the comparative example was X, clearly generating the brake noises.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

EXPLANATION OF REFERENCE NUMBERS

1. Disc brake pad
2. Back plate
3. Friction material
3a. Friction surface
3b. Final inclined surface
5, 6, 7. Borderline
10. Metal preliminarily forming die
15. Upper die
15a. Excess thickness portion
16. Frame die
17. Plunger
17b. First inclined surface
20. Metal forming die
25. Upper die
26. Frame die
27. Plunger
27b. Second inclined surface
30. Preliminarily formed product
30b. Temporary inclined surface
30c. Recess portion
$\beta$. Angle of the temporary inclined surface of the preliminarily formed product
$\alpha$. Angle of the final inclined surface of the friction material

What we claim is:

1. A method for manufacturing a disc brake pad for a disc brake of a motor vehicle, comprising the steps of:

preliminarily forming an intermediary formed product having a temporary inclined surface on an opposite side to be fixed to a back plate by pressurizing and molding powder materials with a metal preliminarily forming die with a first inclined surface; and forming a final inclined surface, having a smaller angle than said temporary inclined surface, on a friction material by pressurizing and molding said intermediary formed product on the back plate with a metal forming die with a second inclined surface; where a recess portion is formed on said intermediary formed product at a side to be fixed to the back plate during said step of preliminarily forming, and said recess portion disappears during said step of forming the final inclined surface.

* * * * *